United States Patent [19]
Dodge et al.

[11] Patent Number: 5,946,986
[45] Date of Patent: Sep. 7, 1999

[54] OPTICAL FIBER PREPARATION UNIT

[75] Inventors: Shawn W. Dodge, Brandenton; Scot K. Ware, Nokomis, both of Fla.

[73] Assignee: Amherst International, Inc., Brentwood, Tenn.

[21] Appl. No.: 08/956,283

[22] Filed: Oct. 23, 1997

[51] Int. Cl.$^6$ .................................................. H02G 1/12
[52] U.S. Cl. ............................................ 81/9.51; 81/9.41
[58] Field of Search .................................. 81/9.51, 9.44, 81/9.41, 9.4

[56] References Cited

U.S. PATENT DOCUMENTS

| | | |
|---|---|---|
| 2,393,919 | 1/1946 | Lucarelle et al. ......................... 81/9.51 |
| 2,978,565 | 4/1961 | Sullivan et al. . |
| 3,765,276 | 10/1973 | Pollitt . |
| 3,864,829 | 2/1975 | Williams . |
| 3,980,861 | 9/1976 | Fukunaga . |
| 4,059,892 | 11/1977 | Siden . |
| 4,104,012 | 8/1978 | Ferrante ............................... 81/9.51 X |
| 4,261,231 | 4/1981 | Bleakley . |
| 4,271,729 | 6/1981 | Perrino et al. . |
| 4,386,541 | 6/1983 | Robertson et al. . |
| 4,434,554 | 3/1984 | Korbelak . |
| 4,643,520 | 2/1987 | Margolin . |
| 4,748,871 | 6/1988 | Zdzislaw . |
| 4,790,465 | 12/1988 | Fellows et al. . |
| 4,805,301 | 2/1989 | Chapin et al. . |
| 4,932,292 | 6/1990 | Merrick . |
| 4,954,152 | 9/1990 | Hsu et al. . |
| 4,958,905 | 9/1990 | Tynes et al. . |
| 4,969,703 | 11/1990 | Fyfe et al. . |
| 4,971,418 | 11/1990 | Dorsey et al. . |
| 5,033,335 | 7/1991 | Yatsu et al. . |
| 5,298,105 | 3/1994 | Dorsey . |
| 5,522,130 | 6/1996 | Wollerman ........................... 81/9.51 X |

Primary Examiner—D. S. Meislin
Attorney, Agent, or Firm—Banner & Witcoff, Ltd.

[57] ABSTRACT

A device for stripping the coating from a coated fiber. The device comprises a base having a longitudinal axis extending parallel to the longitudinal axis of a fiber when the fiber is positioned within the device. The device also comprises a coated fiber retaining member coupled to the base. The coated fiber retaining member has a fiber holding portion for retaining a portion of a coated fiber along the longitudinal axis. A stripping tool including at least two stripping blades is rotatably mounted to the base. One of the blades of the stripping tool has a beveled surface positioned at a 45° angle relative to the longitudinal axis of the base. This angle of the stripping tool, coupled with the bevel of the stripping blade ensures that the coating is pulled along the axis of the fiber, which keeps the fiber from bending or scratching. The beveled surface faces the coated fiber retaining member. A heating element is disposed on the side of the stripping blades opposite from the coated fiber retaining member for heating the fiber without contacting it.

19 Claims, 10 Drawing Sheets

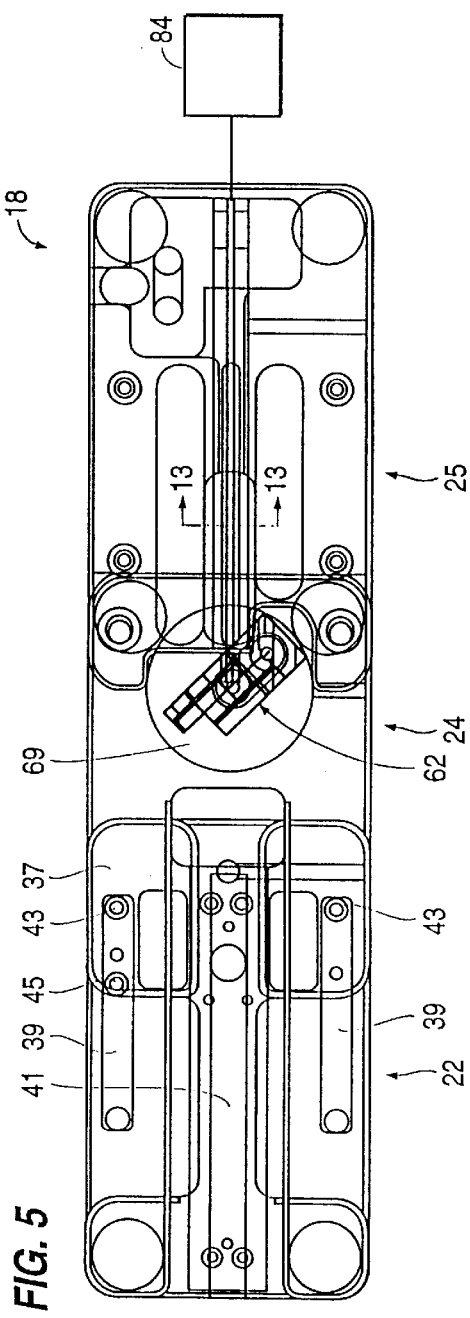
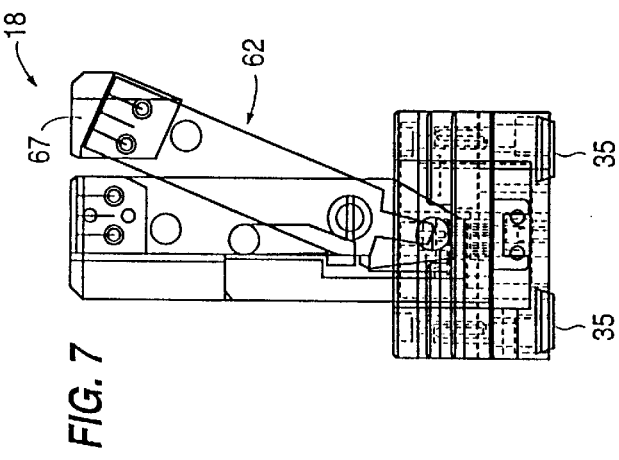
FIG. 5
FIG. 7

OPTICAL FIBER PREPARATION UNIT

CROSS REFERENCE TO RELATED APPLICATIONS

This application is related to the U.S. patent application of Shawn W. Dodge and Scot K. Ware entitled "Optical Fiber Preparation Unit" filed simultaneously herewith, which is herein incorporated by reference.

FIELD OF INVENTION

The present invention relates to optical fibers splices, and particularly to an optical fiber preparation unit having a fiber stripper that is used to strip a coating from an optical fiber, a cleaver, and a base to which the cleaver and stripper are attached.

BACKGROUND OF THE INVENTION

Optical fibers are normally constructed with a protective outer coating, which is frequently acrylate or another plastic material. The coating material is typically applied to the fiber during manufacture while the coating is still tacky. The coating may be subsequently cured by ultraviolet light to form the coated fiber. A jacket may be provided around one or more coated fibers for protection. Prior to splicing the optical fibers, the ends of two optical fibers to be spliced together need to be stripped of their protective coating and cleaved to provide an accurately sheared end surface for mating.

Existing stripping devices include a hand-held stripping device as shown in FIGS. 1–3, and is commercially available through the Miller Tool Division of Ripley Company of Cromwell, Connecticut. This hand-held tool 1 includes a pair of levers 2 pivotally attached to each other about an axis provided by a screw and nut assembly 3. Each lever 2 has a flat side which interfaces with the flat side of the other lever in a manner similar to a pair of scissors. A triangular shaped cutout portion 4 is provided in each lever 2 adjacent its forward end. The triangular shaped cutout portions 4 have a beveled surface 5 facing away from the opposing lever 2. A spring 6 is mounted at each end to a respective lever 2 to bias the levers 2 into an open position. A set screw 7 projecting from a rivet on one lever 2 engages a side surface 8 on the opposing lever to serve as a stopping arrangement that limits their relative movement in the direction that the handle portions 9 of the levers 2 are moved toward each other. In the maximum closed position, the triangular cutout portions 4 form a diamond shaped opening dimensioned so that the fiber of a properly centered coated fiber could tightly fit inside the diamond. In operation, a coated fiber is inserted perpendicularly into the cutting tool adjacent the triangular cutout regions 4, and the levers are pivoted against the force of the biasing spring 6 causing the beveled surface 5 on one lever 2 and the flat edges of the other lever 2 to cut into the coating of a coated fiber. Holding the fiber steady, the user slides the tool towards the free end of the cable causing the beveled surfaces and edges to scrape off the coating in fragments. It is noted that while the lever 2 with the flat edge facing the free end of the cable will tend to push the coating off of the fiber and the beveled surfaces 5 of the other lever 2 will tend to scrape the coating off of the fiber, the overall effect of this process with this tool 1 is one of scraping the coating off in fragments.

However, this type of striping tool has significant drawbacks. As the fiber is pulled through the beveled surface 5 and the opposing edge, the cutting edges can come into contact with the fiber and scratch it and/or kink it. Other strippers operate on the theory of scraping and are also highly susceptible to scratching the fiber. Moreover, microscopic alignment and tolerancing errors can also cause the fiber to be scratched. This can be significant as one small scratch in the fiber can reduce its strength by up to 90%. Hand-held stripping units lack exceptional stability which can result in misalignment between the fiber and the stripping edges and cause scratching of the fiber.

Attempts to solve these drawbacks have not been entirely successful. U.S. Pat. No. 5,033,335 to Yatsu et al. discloses the use of a heating element which applies direct heat to a clamped free end of the coated fiber. The heating element is intended to soften the coating. However, merely softening the coating does not solve the problem of scratching. Moreover, the combination of clamping the free end of the fiber and applying direct heat can damage the fiber. Additionally, the fact that the stripping blade surface does not extend entirely around the circumference of the coated fiber makes the stripping process less than optimal.

U.S. Pat. No. 4,971,418 to Dorsey et al. attempts to overcome these problems by stripping the coating off of the fibers by using a combination of an acid and a laser to melt away the coating. However, this is a costly process which has drawbacks beyond its cost, they include the generation of toxic waste and the exposure of potentially hazardous material to the operator. Accordingly, a solution that overcomes the drawbacks of the prior art was thus necessary.

SUMMARY OF THE INVENTION

It is an object of the present invention to overcome the drawbacks of the prior art and provide a stripping device that does not scratch or bend a fiber.

It is also an object of the present invention to provide an improved optical fiber preparation unit to strip and shear coated fibers prior to splicing.

It is further an object of the present invention to provide a stripping device which is rotatably secured to a member received within a base so that a beveled stripping blade can be positioned at a determined angle relative to the longitudinal axis of the fiber so that the fiber will not be bent or scratched during stripping.

The present invention relates to a device for stripping the coating from a coated fiber. The device comprises a base having a longitudinal axis extending parallel to the longitudinal axis of a fiber when the fiber is positioned within the device. The device also comprises a coated fiber retaining member coupled to the base. The coated fiber retaining member has a fiber holding portion for retaining a portion of a coated fiber along the longitudinal axis. A stripping tool including at least two stripping blades is mounted to the base. One of the blades of the stripping tool has a beveled surface positioned at an angle less than 90° relative to the longitudinal axis of the base. The angle is preferably about 45° for optimum stripping without scratching or kinking of the fiber. This angle of the stripping tool, coupled with the bevel of the stripping blade ensures that the coating is pulled along the axis of the fiber, which keeps the fiber from bending or scratching. The beveled surface faces the coated fiber retaining member. A heating element is disposed on the side of the stripping blades opposite from the coated fiber retaining member for heating the fiber without contacting it.

The stripping tool according to the present invention is rotatably mounted to the base by a rotatable member received within a recess in the base. The tool is also positioned perpendicular or vertical to the base when it is horizontal. The stripping tool has a plurality of stripping blades, each being coupled to a respective gripping handle. One of the handles is secured to a vertical support member and the other is able to move relative thereto. The blades can be moved towards and away from each other by pivoting one of the gripping handles.

Unlike contemporary strippers, the present invention does not fragment the coating as it cuts. Instead, it uses heat to soften the coating and then nicks the coating with the blade so that the coating is pulled off in one piece. The blades of the present invention are used to nick and hold the coating, they are not used to fragment it. The use of the blades as holders helps to keep the blades from scratching or kinking the fiber. Also, nothing during the stripping or fiber cutting steps contacts the stripped portion of the fiber which remains after the fiber cutting step.

BRIEF DESCRIPTION OF THE DRAWINGS

FIG. 5 is a top plan view of the stripping device according to the present invention;

FIG. 7 is an end elevational view of the stripping device of FIG. 5;

DETAILED DESCRIPTION OF THE INVENTION

Figure 4:
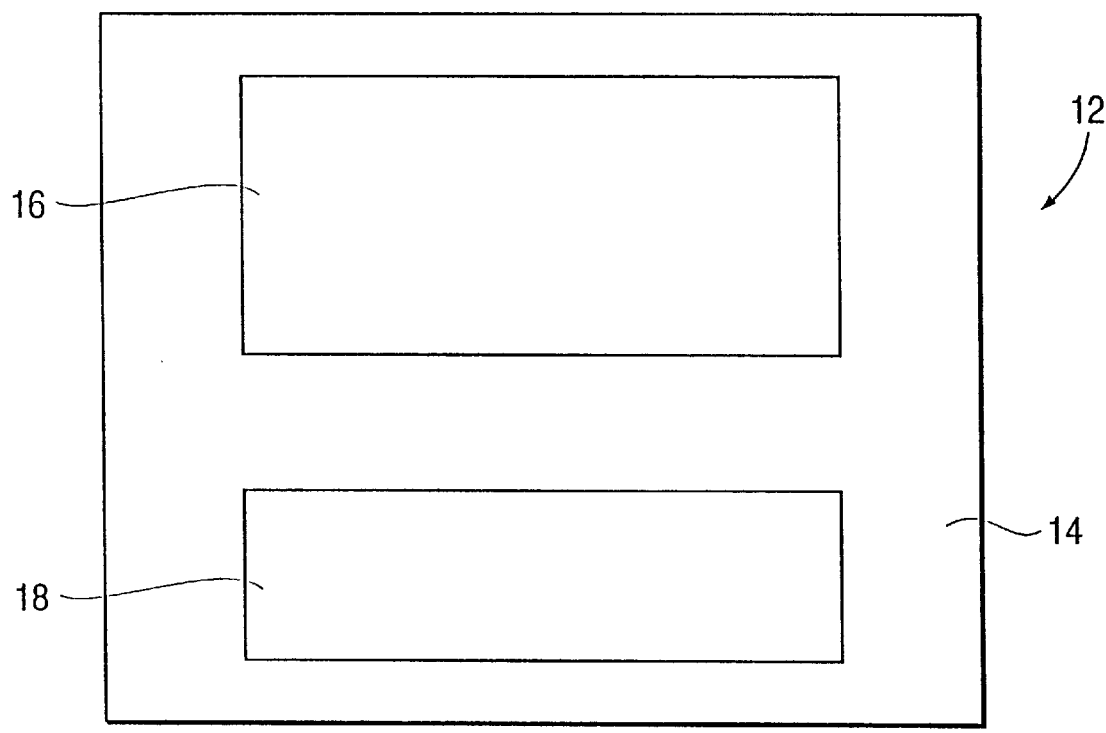
FIG. 4 is a schematic top plan view of the optical fiber preparation unit of the present invention.

A splicing preparation unit is shown in FIG. 4 and is generally designated by reference numeral 12. As can been seen in the schematic representation, splicing preparation unit 12 includes a single generally horizontal base 14, a stripper unit 18 mounted on the base 14, and a cleaver unit 16 also mounted to the base 14. Details of the base 14 and the cleaver unit 16 can be found in the co-pending U.S. patent application of Shawn W. Dodge and Scot K. Ware entitled "Optical Fiber Preparation Unit" filed simultaneously herewith.

Figure 8:
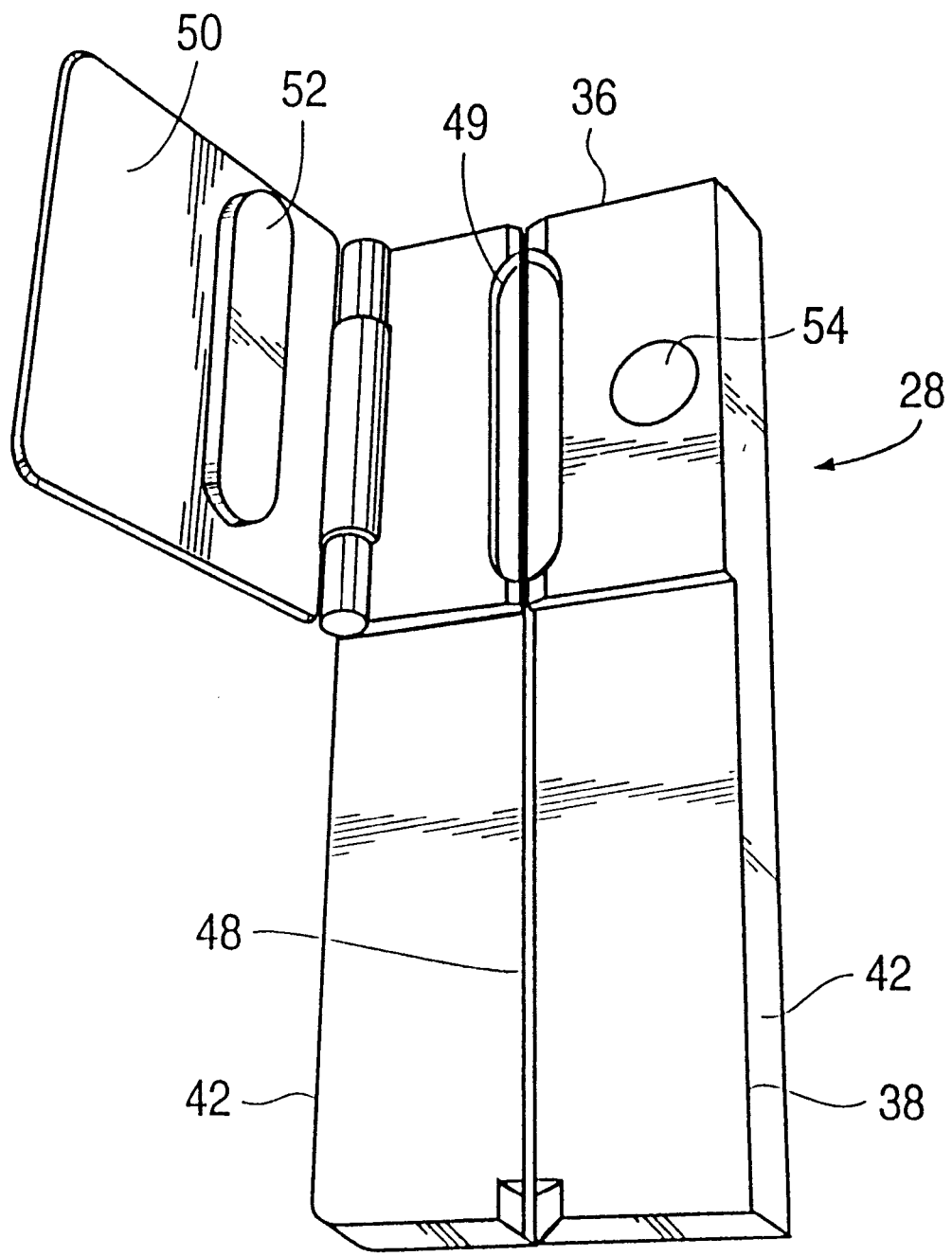
FIG. 8 is a top plan view of the fiber holding member shown with its pivotal clamping element in an open position.
Figure 9:
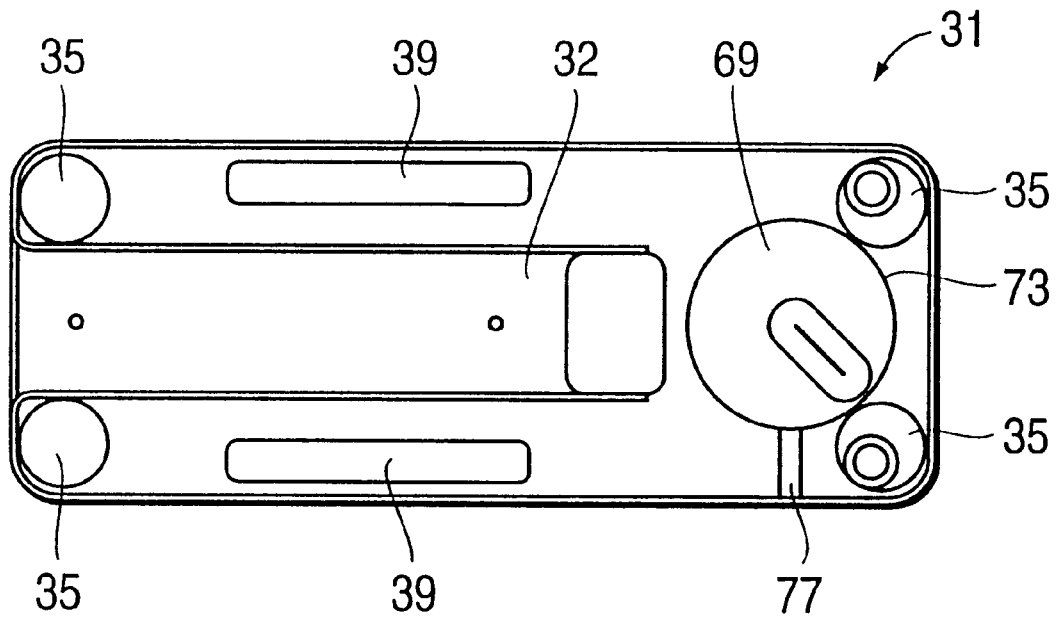
FIG. 9 is a top plan view of the first base member.

For example, the base 14 is preferably made from DEL-RIN or any suitable plastic or metal material, and preferably includes a series of holes or cutouts therein for mounting the cleaver unit 16 and/or permitting access to portions of the cleaver unit 16 for adjustment of cleaver features or replacement of parts, e.g., batteries. The cleaver unit 16 is known in the art and is commercially available. Preferred cleavers are made by York Technology, Ltd of England and Photon Kinetics Inc of California. However, other cleavers may be used. Depending upon the cleaver unit 16 used, it is preferably modified to include a holder, not shown, to accommodate the movable fiber holding member as shown in FIG. 8 and described below.

The base 14 stabilizes the cleaver unit 16 and the components of the stripper unit 18 by balancing the weight of each on the base 14 to achieve increased stability over existing units. This stability enhances the performance of both units, especially the stripper unit 14 as it is important to make sure that the fiber is not scratched which could occur as a result of the instability of the unit. The base 14 also spaces the units 16 and 18 apart by a distance between 2–6 inches, preferably approximately 3 inches. This spacing enhances the efficiency by the user in terms of conservation of motion and ergonomics.

Figure 6:
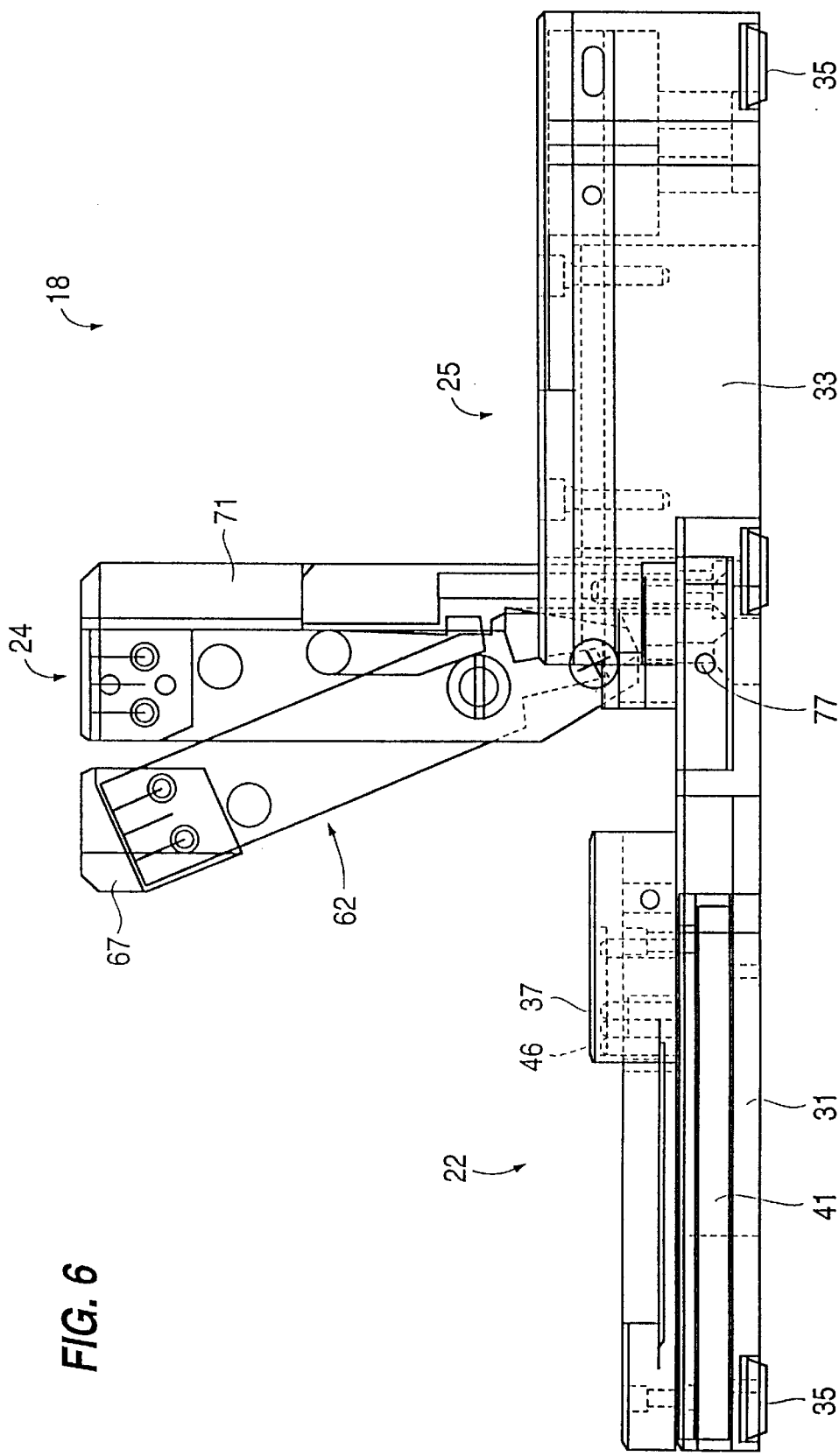
FIG. 6 is a side elevational view of the stripping device of FIG. 5.

As shown in FIGS. 5–7, the stripper unit 18 includes three portions: a fiber holding portion 22, a fiber stripping portion 24, and a fiber coating heating portion 25. The stripping unit 18 can be adjusted to strip longitudinal lengths of between 2 and 25 mm in order to accommodate different splicing machines which require different stripped lengths of fiber. In sum, the fiber holding portion 22 holds a coated fiber while the fiber stripping portion 24 engages the coated fiber at a determined location. The fiber coating heating portion 25 heats the coating on the fiber between the portion engaged by the fiber stripping portion 24 and the free end to soften the coating in this region. The fiber holding portion 22 is mounted on a slide and is moved away from the fiber stripping portion 24. The fiber stripping portion 24 removes the softened coating on the fiber between the initially engaged point and the free end of the fiber.

The fiber stripper unit 18 includes a base comprised of a first base member 31 that includes features of the fiber holding portion 22 and the fiber stripping portion 24, and a second base member 33 that includes elements of the fiber coating heating portion 25. The first and second base members 31 and 33 are attached together by conventional hardware, e.g., screws, to form a rigid base extending along the length of the stripper unit 18. This base assembly can be mounted to base 14 to form a preparation unit with a cleaver 16, or in the alternative, the base of fiber stripper unit 18 can be provided with supports 35 that elevate and balance the fiber stripper unit 18 with respect to a supporting surface.

The fiber holding portion 22 includes a longitudinal track 32 recessed in first base element 31 and extending along in a direction parallel to the longitudinal axis of a fiber to be stripped. A slidable fiber platform adapter 37 is mounted for longitudinal movement, i.e., towards and away from fiber stripping portion 24, within the longitudinal track 32 by a precision ball bearing linear slide mechanism. The linear slide mechanism, schematically shown by reference numeral 41, preferably includes a track and rotatable bearing elements and permits smooth movement of the slidable fiber platform adapter 37 in the direction of the longitudinal axis of the fiber while minimizing undesirable movement in other directions.

The first base element 31 also includes a pair of longitudinal movement limiting tracks 39. The slidable fiber platform adapter 37 has fore and aft screws 43 and 45 that extend down into limiting tracks 39. The forward ends of the limiting tracks 39 act as stops to prevent the slidable fiber platform adapter 37 from moving past a predetermined point by providing an abutment for fore screws 43. Similarly, the rearward ends of the limiting tracks act as stops to prevent the slidable fiber platform adapter 37 from moving past a predetermined point by providing an abutment for aft screws 45.

Figure 10:
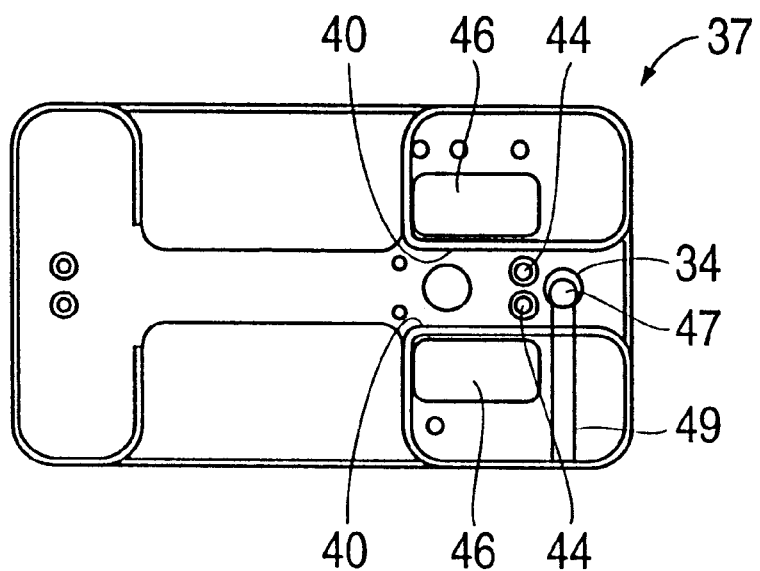
FIG. 10 is a top plan view of the sliding fiber holding block.

The slidable fiber platform adapter 37 accurately positions a removable fiber holder 28, as shown in FIG. 8, and therefore accurately positions the coated fiber therein, with respect to base 14 and fiber stripping portion 24. The slidable fiber platform adapter 37 also helps maintain the fiber in a straight line along the axis of the base so that microbending or kinking does not occur in the fiber. To accurately position fiber holder 28 with respect to support block 26 and support block 26 with respect to base 14, an adjustment system permits adjustment of the longitudinal position of the removable fiber holder 28 with respect to the slidable fiber platform adapter 37. As shown in FIG. 10, this system includes a positioning screw 34 threadably inserted into a hole 47 adjacent the front of slidable fiber platform adapter 37. The screw 34 includes a head portion with an offset outer surface such that the distance between the outer surface of the head of screw 34 and the location of the hole 47 varies depending upon the angular rotation of the screw 34. This provides a stop for the leading edge 36 of the base section 38 of removable fiber holder 28 and acts as an eccentric camming surface. A hole 49 is provided in the side of the slidable fiber platform adapter 37 to permit entry of a screw to retain the eccentric screw. Accordingly, the removable fiber holder 28 and the position of the fiber can be adjusted by rotating screw 34. Slidable fiber platform adapter 37 includes upwardly projecting guide walls 40 that guide the lateral position of removable fiber holder 28 by guiding the side edges 42 of the fiber holder 28.

Removable fiber holder 28 is positioned and coupled to slidable fiber platform adapter 37 by a magnetic coupling system including a pair of magnets 44 positioned on the upper surface of slidable fiber platform adapter 37 and a pair of magnets, not shown, positioned on the lower side of removable fiber holder 28. The poles of the magnets are oriented such that the magnets 44 on slidable fiber platform adapter 37 attract the magnets on the underside of removable fiber holder 28. However, the relative positioning of the magnets and the stopping effect of the positioning screw 34 prevent the magnets on the fiber holder 28 from becoming coincident with the magnets 44. Accordingly, when the removable fiber holder 28 is placed on the slidable fiber platform adapter 37, the magnets create an attraction force that holds the fiber holder 28 to the slidable fiber platform adapter 37 vertically and pushes the leading edge 36 of the fiber holder 28 into positioning screw 34. The slidable fiber platform adapter 37 further includes recesses 46 in its side walls 40 to aid in the removal of the fiber holder 28 from the slidable fiber platform adapter 37 after the end of the fiber has been stripped. A similar magnetic coupling system is preferably provided on a holder of the cleaver unit 16 so that after the fiber has been stripped, the fiber holder 28 can be lifted off slidable fiber platform adapter 37 and placed on a holder of the cleaver 16.

The fiber holder 28 is shown in further detail in FIG. 8. Base section 38 further includes a longitudinal V-shaped groove 48 extending along its entire length for securely holding a coated fiber therein. The forward portion of the base section 38 includes a recess 49 on opposing sides of groove 48. A cover 50 is pivotally attached to base section 38 by a hinge and includes a downwardly depending block 52. A magnet 54 is mounted in the surface of the base section 38 disposed on the side of the groove 48 opposite the hinge attachment between the cover 50 and the base section 38. To couple a coated fiber to the fiber holder 28, the cover 50 is opened and the coated fiber is inserted into the groove 48 with a predetermined fiber length extending in front of the leading edge 36 of the base section 38. The fiber may be measured by any suitable tool or device. The cover 50 is then closed and downwardly depending block 52 fills the recess 49 and clamps the coated fiber into the groove 48. The magnet 54 provides an attraction force with the pivotable cover 50, which is metallic, to maintain a clamping force on the fiber. Fiber holders as shown in FIG. 8 are known in the art and are sold by Ericsson of Sweden. These fiber holders are available in different widths for different splicing applications and with different groove sizes for receiving different sized fibers. Moreover, fiber holders 28 preferably have right and left hand orientations for simultaneous opening when the exposed and stripped free ends are spliced.

Figure 1:
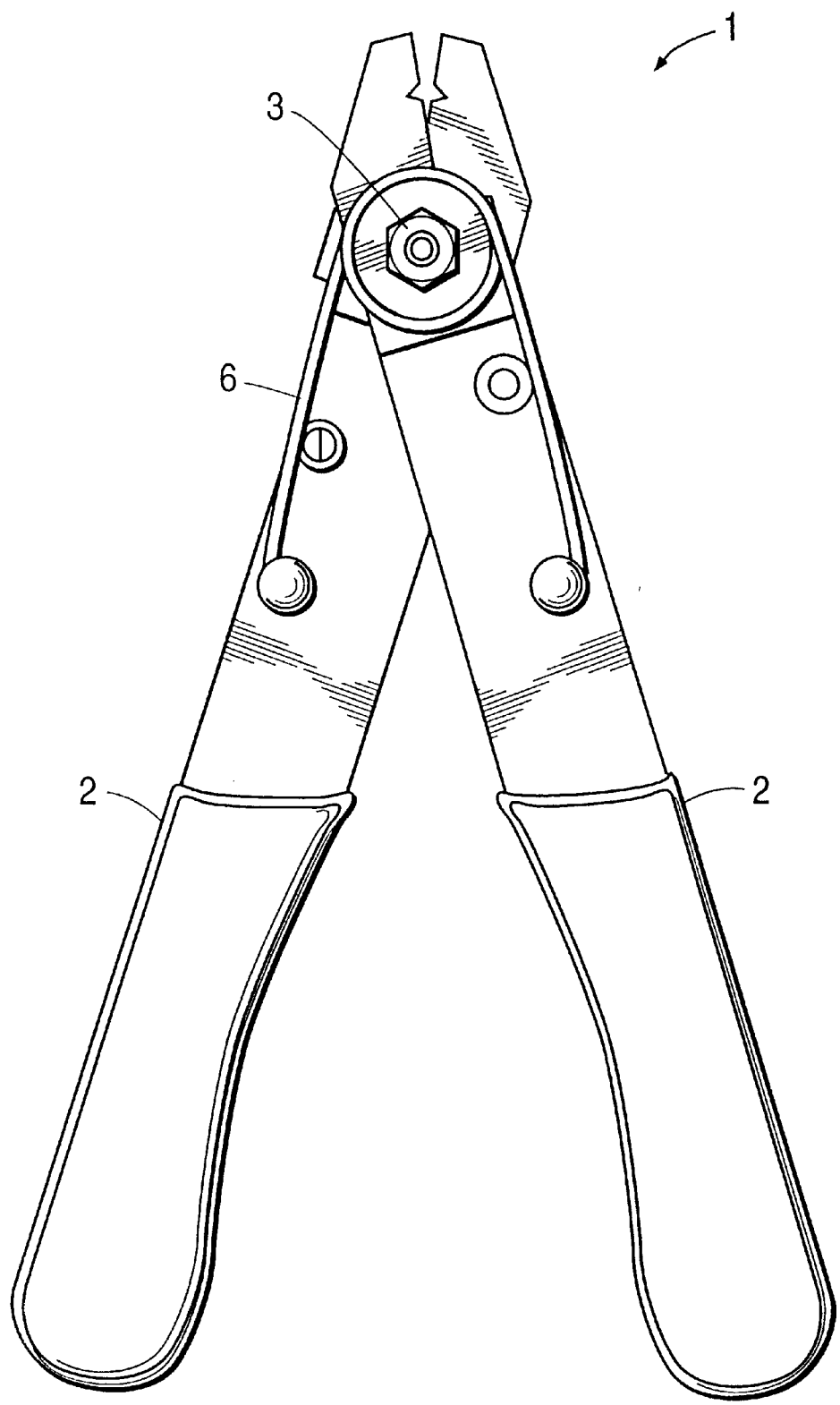
FIG. 1 is a plan view of one side of a prior art hand-held stripping tool.
Figure 2:
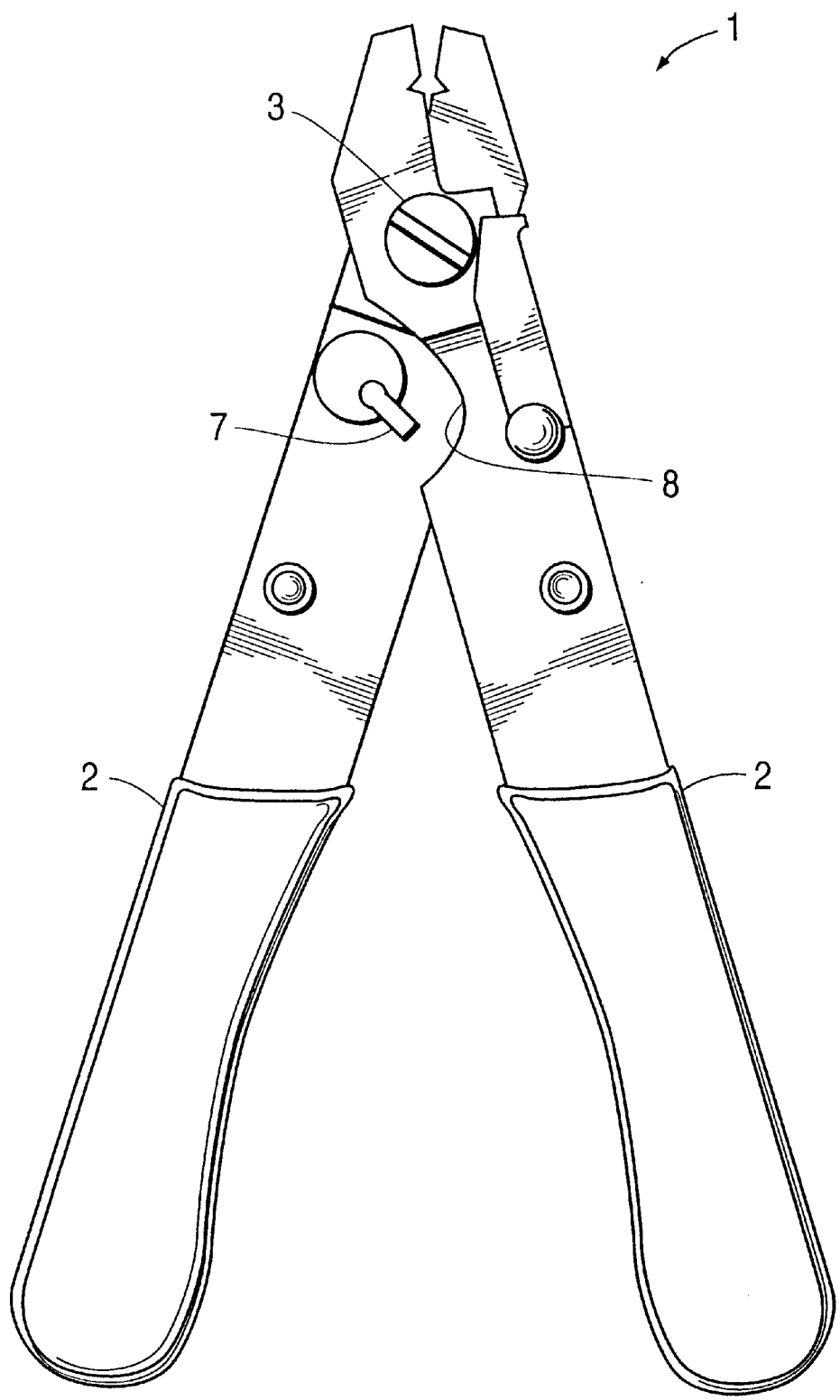
FIG. 2 is a plan view of the other side of the prior art hand-held stripping tool of FIG. 1.
Figure 3:
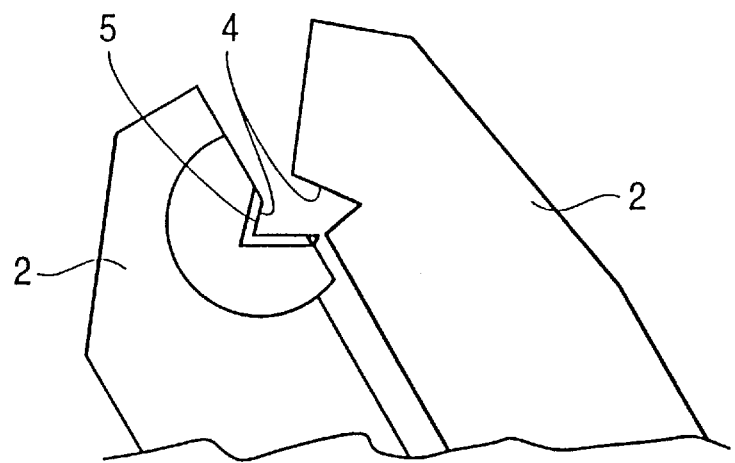
FIG. 3 is an enlarged plan view of the stripping portion of the prior art hand-held stripping tool of FIG. 1.
Figure 11:
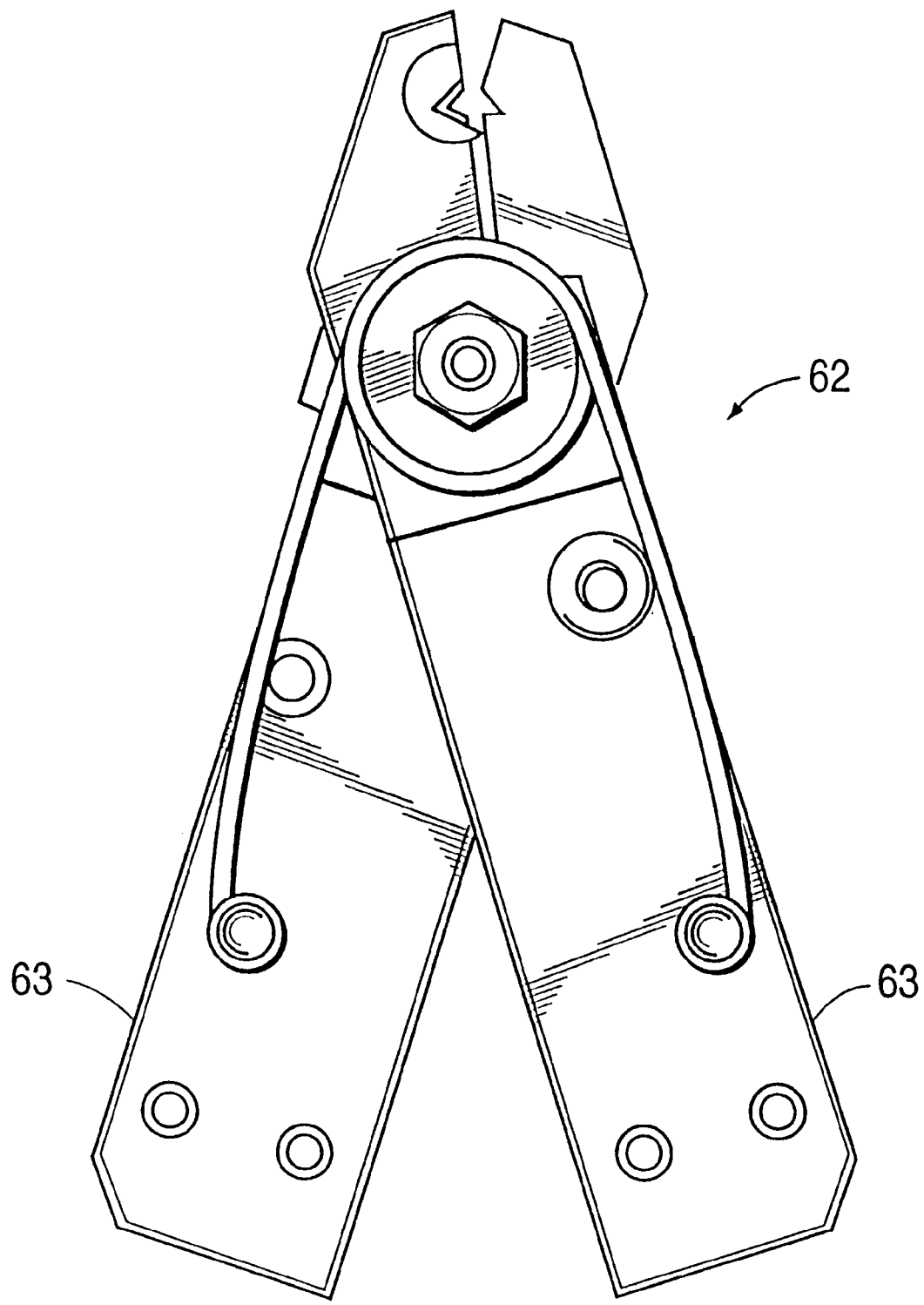
FIG. 11 is a plan view of one side of stripping tool.
Figure 12:
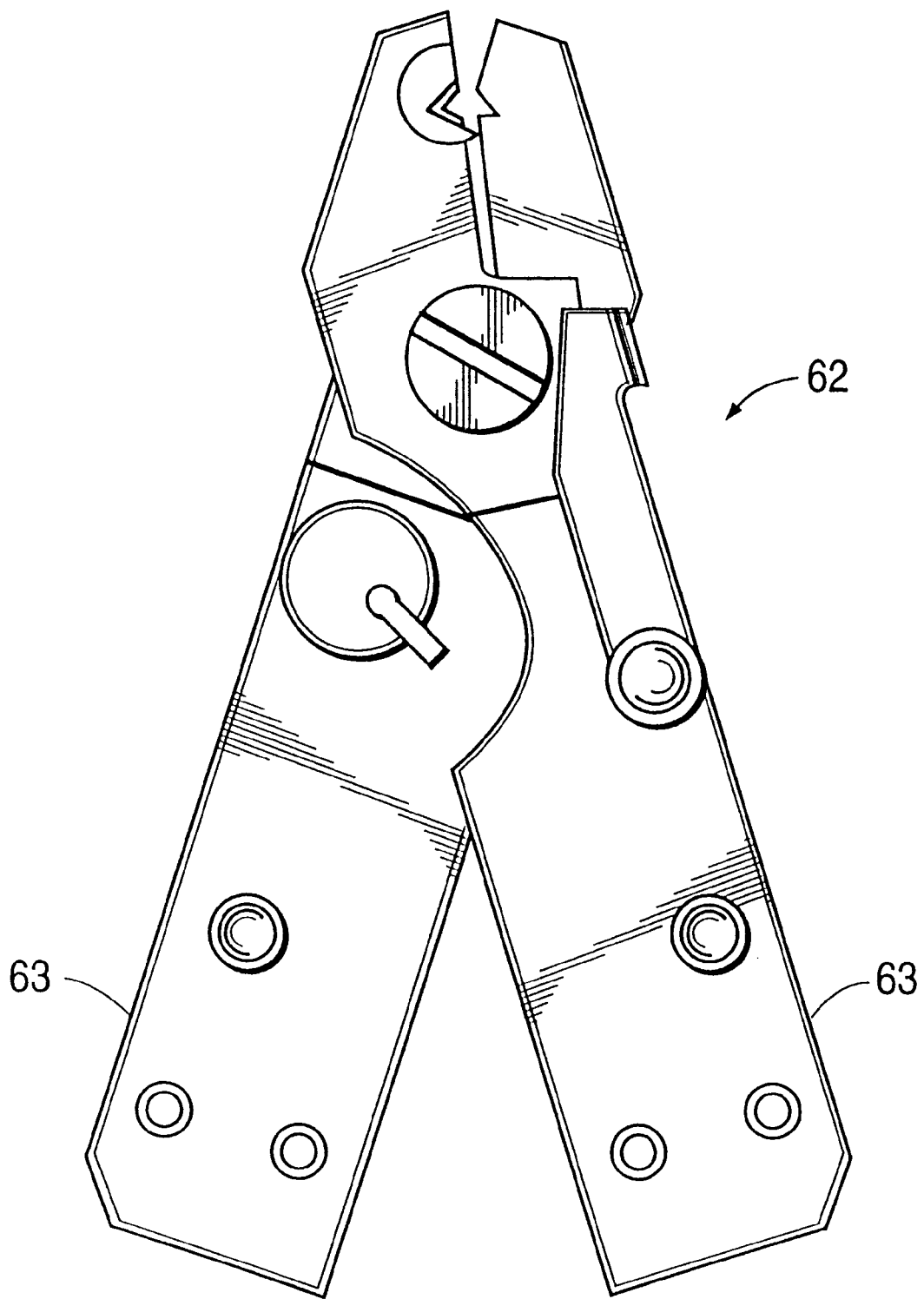
FIG. 12 is a plan view of the other side of the stripping tool of FIG. 11.

The fiber stripping portion 24 incorporates a modified version of the commercially available stripping tool as shown in FIGS. 1–3. As shown in FIGS. 11 and 12, this stripping tool 62 differs from that of FIGS. 1–3 in that the levers 63 have been shortened and holes 65 have been drilled near the ends thereof End pieces or gripping handles 67 are attached to one of these shortened levers to make them easier to use when oriented as mounted. The other shortened lever of stripping tool 62 is mounted to a circular rotatable platform 69 via a mounting member 71. The circular rotatable platform 69 is mounted within a circular recess 73 in first base element 31. Thus, the angle in which the stripping tool 62 engages the coated fiber can be changed by rotating the platform 69 within the recess 73, as desired, to achieve optimum stripping characteristics without scratching the fiber. The angular position of the rotatable platform 69 can be fixed by a set screw which penetrates a hole 77 in the side wall of the first base element 31. It has been found that disposing the stripping tool 62 at an angle of 45°, as shown in FIG. 5, relative to the longitudinal axis of the fiber achieves optimum results for many different types and sizes of fibers. An adjustment of the optimum angle may be necessary in order to compensate for variations in the machining of the stripping tool.

The fiber coating heating portion 25 includes a heating system for softening the coating on the fiber to aid in the removal of the coating by the blade without scraping the fiber as the coating is being pulled off. The heating system includes a heating element 82 coupled to a closed-loop controller 84 schematically shown in FIG. 5. The heating element 82 is preferably U-shaped and preferably made from a nickel-chromium alloy, a conductive ceramic or another suitable conductive material. The controller 84 is a well known PID controller which produces an output signal for providing a proportional amount of heat based on current temperature readings, the rate of change in the temperature and the average temperature from previous samples. The controller 84 is connected to a power source and has lines connected to the heating element 82 for providing current for heat and for determining the temperature readings. The temperature readings control the amount of current applied to the heating element 82 to consistently achieve a predetermined temperature for softening the coating of the fiber. In a preferred arrangement, the temperature is closely controlled and maintained at a desired temperature depending upon the type of coating used. Such a desired temperature is preferably about 350 degrees Fahrenheit, but other temperatures between 300–350 degrees have been found to work well without damaging the fiber. Temperatures between 220 and 365 degrees Fahrenheit have also been used depending on the specific fiber.

As can be seen in FIGS. 5–7 and 13, the heating element 82 is positioned within and attached, via an adhesive or fastening system, to a U-shaped heater casing 86 which is preferably made from aluminum or a heat resistant plastic material. Heater casing 86 is in turn located within a guide channel 88 in second base element 33. A top plate 87 is mounted above the heating element 82 for worker safety and to keep the heating element 82 in alignment. It is to be noted that numerous other structural arrangements for mounting the heating element may be used.

Figure 13:
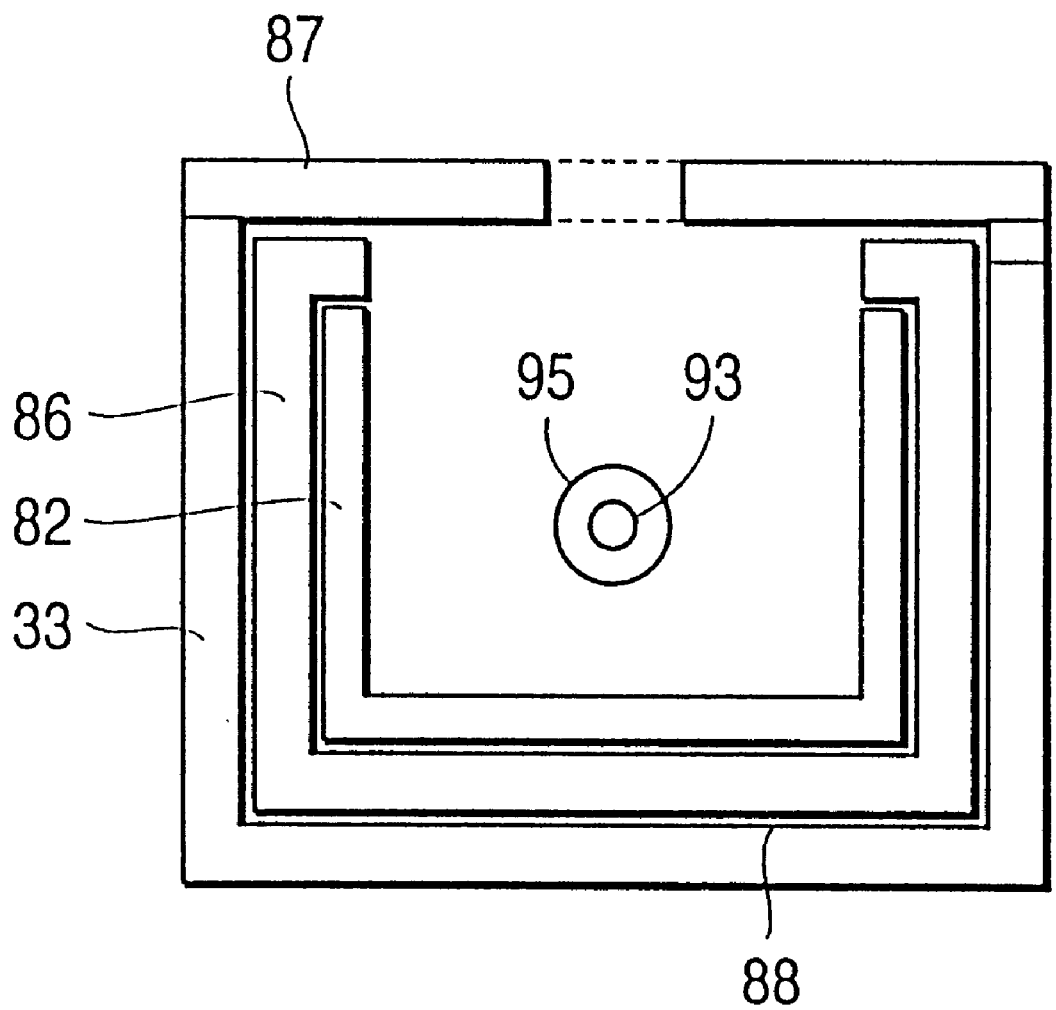
FIG. 13 is a cross section taken through line 13—13 of FIG. 5.

As shown in FIG. 13, the heating element 82 is sized to be larger than the outer diameter of a coated fiber and not to contact the fiber. Thus, in operation, the heating element is heated and controlled at a desired temperature, e.g., 350° F. Due to radiation and convection from the heat of heating element 82, the coating 95 around fiber 93 in the channel softens and tends to loosen its bond with the fiber 93. It is noted that while the free end of the cable is unrestrained and unsupported, the rigidity of the fiber 93 and its short length that extends into the stripping tool 62 holds it relatively straight and between the surfaces of the heating element 82

In operation, a coated fiber is inserted into a removable fiber holder 28 as previously described, and the removable fiber holder 28 is placed on the sliding fiber platform adapter 37 with adapter 37 being positioned closest to stripping tool 62. The free end of the coated fiber is placed into a stripping gap in the stripping tool 62. The coating 95 on the end section of fiber 93 between the stripping tool 62 and the end of the fiber begins to soften when the heating element 82 is activated. The heating element never touches the fiber or its coating. The user then squeezes the levers 63 towards each other, and slides the sliding fiber platform adapter 37 to the position furthest from stripping tool 62. When the handles are squeezed, the edges for the stripping tool cut into the coating 95 and the coating is pulled off of the fiber 93 in one piece without scratching the fiber 93 when the sliding fiber platform adapter 37 is moved away from the stripping tool 62. The fiber 93 then has a free end that is stripped of its coating. The removable fiber holder 28 with the stripped free end may be lifted from sliding fiber platform adapter 37 and placed on a holder of the cleaver unit to be cut. Between the time the end of the fiber is stripped and when it is spliced, nothing is intended to contact the stripped end which remains after the fiber cutting process. After the ends of two fibers are stripped and cut, they are brought to a splicing machine, not shown, to be fiised.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A device for stripping the coating from a coated fiber, said coated fiber having an outer diameter, said device comprising:
    a base;
    a coated fiber retaining member coupled to said base, said coated fiber retaining member having an elongated fiber holding groove defining a longitudinal axis and adapted for securely retaining a portion of a coated fiber so that the fiber extends along said longitudinal axis from the coated fiber retaining member to a free end;
    a stripping tool mounted to the base, the stripping tool including at least two stripping blades, and least one of said blades having a beveled surface adapted for cutting into the coating of the coated fiber at a location between the coated fiber retaining member and the free unsupported end of the fiber; and
    a horizontally elongated heating element disposed on the side of the stripping blades opposite from said coated fiber retaining member and between the stripping blades and the free unsupported end of the fiber, said heating element having first and second opposing portions and a third portion extending therebetween, said longitudinal axis extending between said first and second opposing portions, said heating element adapted to heat a horizontally elongated portion of the coated fiber between the stripping blades and the free end of the fiber by convection;
    wherein said coated fiber retaining member is slidably coupled to the base enabling movement of the coated fiber retaining member relative to the stripping tool and heating element along the longitudinal axis.

2. The device of claim 1, wherein said stripping tool includes a pair of handles, each said handle being secured to a respective one of said stripping blades; and said stripping blades adapted to extend entirely around a coated fiber when said blades are placed in a stripping position.

3. The device of claim 2, wherein one of said handles is secured to a vertical support member and said other handle moves relative thereto.

4. The device of claim 2, wherein the stripping blades can be moved towards and away from each other in a plane, said stripping tool is mounted to said base by a rotatable member to permit angular adjustment between the plane of movement of the stripping blades and the longitudinal axis.

5. The device of claim 4, wherein said rotatable member is disposed within an opening in said base and a threaded member is inserted within said base for limiting the rotation of said member.

6. The device of claim 1, further comprising a controller for adjusting the temperature of the heating element.

7. The device of claim 6 wherein said controller includes a temperature sensing device and closed loop temperature controls.

8. The device of claim 7, wherein said controller is a PID controller.

9. The device of claim 1, wherein said heating element is U-shaped in cross-section and is adapted to extend around at least three sides of the coated fiber for softening the coating when the fiber is positioned within said retaining member.

10. The apparatus of claim 1, further comprising adjustment means for adjustably setting the relative positioning between the coated fiber retaining member and the base.

11. An apparatus for stripping a protective coating from a fiber, said apparatus comprising:
    a base;
    a coated fiber retaining member coupled to said base, said coated fiber retaining member having an elongated fiber holding groove defining a longitudinal axis and adapted for retaining a portion of the coated fiber so that the fiber extends along said longitudinal axis; and
    a stripping tool rotatably mounted to the base, said stripping tool having a plurality of stripping blades each coupled to a respective gripping handle, wherein the stripping blades can be moved towards and away from each other in a plane by pivoting at least one of the gripping handles, said stripping tool rotatably mounted to the base to permit angular adjustment between the plane of movement of the stripping blades and the longitudinal axis.

12. The apparatus of claim 11, wherein said stripping blades including a notch therein with a beveled side facing the coated fiber retaining member, said stripping blades adapted to extend entirely around the coated fiber when the handles are placed in a stripping position.

13. The apparatus of claim 11, further comprising a heating element disposed adjacent the stripping tool for softening the coating around the portion of the fiber to be stripped, said stripping tool being disposed between the heating element and the coated fiber retaining unit.

14. The apparatus of claim 11, wherein said base includes a recess, said apparatus further including a rotatable member disposed within the recess for rotatable movement therein, said stripping tool is mounted to said rotatable member.

15. The apparatus of claim 11, wherein said coated fiber retaining member is slidably coupled to the base enabling movement of the coated fiber retaining member along the longitudinal axis.

16. A device for stripping the coating from a coated fiber, said device comprising:

a base;

a coated fiber retaining member coupled to said base, said coated fiber retaining member having an elongated fiber holding groove defining a longitudinal axis for retaining a portion of a coated fiber so that the fiber extends along the longitudinal axis;

a stripping tool mounted to the base, the stripping tool including at least two stripping blades, one of said blades having a beveled surface; and a heating element disposed on the side of the stripping blades opposite from said coated fiber retaining member, said heating element is elongated along the longitudinal axis and U-shaped in cross section.

17. The device of claim 16, wherein said stripping blades include first and second stripping blades, said first stripping blade being mounted for pivotal movement around a pivot point, said stripping tool further includes a handle, said handle being secured to the first stripping blade at an end opposite from its pivot point, and wherein said second stripping blade is fixedly secured to a vertical support member and said first stripping blade moves relative thereto.

18. The device of claim 16, wherein said elongated heating element includes first and second opposing sides and a third side therebetween, said first and second sides being parallel to and on opposite sides of the longitudinal axis.

19. The device of claim 18, further comprising a controller having a temperature sensing device and closed loop temperature controls for adjusting the temperature of the heating element.

\* \* \* \* \*